United States Patent [19]

Ekholm

[11] 4,029,196
[45] June 14, 1977

[54] DEVICE FOR ROTATING PIECES OF LUMBER

[75] Inventor: Rolf Ekholm, Nyland, Sweden

[73] Assignee: A.B. Hammars Mekaniska Verkstad, Nyland, Sweden

[22] Filed: Sept. 19, 1975

[21] Appl. No.: 614,883

[30] Foreign Application Priority Data

Oct. 7, 1974 Sweden .............................. 7412583

[52] U.S. Cl. .................................. 198/413; 83/706; 83/708; 214/340
[51] Int. Cl.² ....................................... B65G 47/24
[58] Field of Search ............... 198/127 R, 236–238, 198/241, 283, 286, 413, 373, 783; 214/338–340; 83/78, 109, 156, 161, 401, 412, 704–706, 708

[56] References Cited

UNITED STATES PATENTS

| 1,928,811 | 10/1933 | Burns | 83/704 |
| 2,771,922 | 11/1956 | Gyllenberg | 214/338 |
| 3,279,585 | 10/1966 | Shen | 198/127 R |
| 3,367,479 | 2/1968 | Letson et al. | 198/127 R |

FOREIGN PATENTS OR APPLICATIONS 164,853  9/1958  Sweden .............................. 83/401

Primary Examiner—Evon C. Blunk
Assistant Examiner—Joseph E. Valenza
Attorney, Agent, or Firm—Silverman & Cass, Ltd.

[57] ABSTRACT

A longitudinal lumber conveyor has sets of transverse tooth wheels aligned on each side of the axis of the conveyor. The tooth wheels are mounted on a lifting frame which may be lifted above the conveyor transport plane to rotate pieces of lumber thereon. After the pieces of lumber have been inspected the lifting frame and tooth wheels thereon are lowered and the pieces of lumber are then conveyed to the next processing station.

3 Claims, 6 Drawing Figures

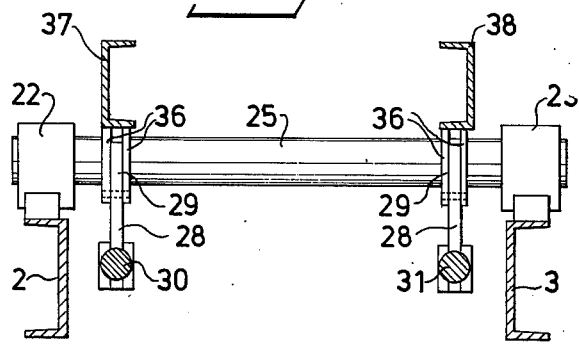
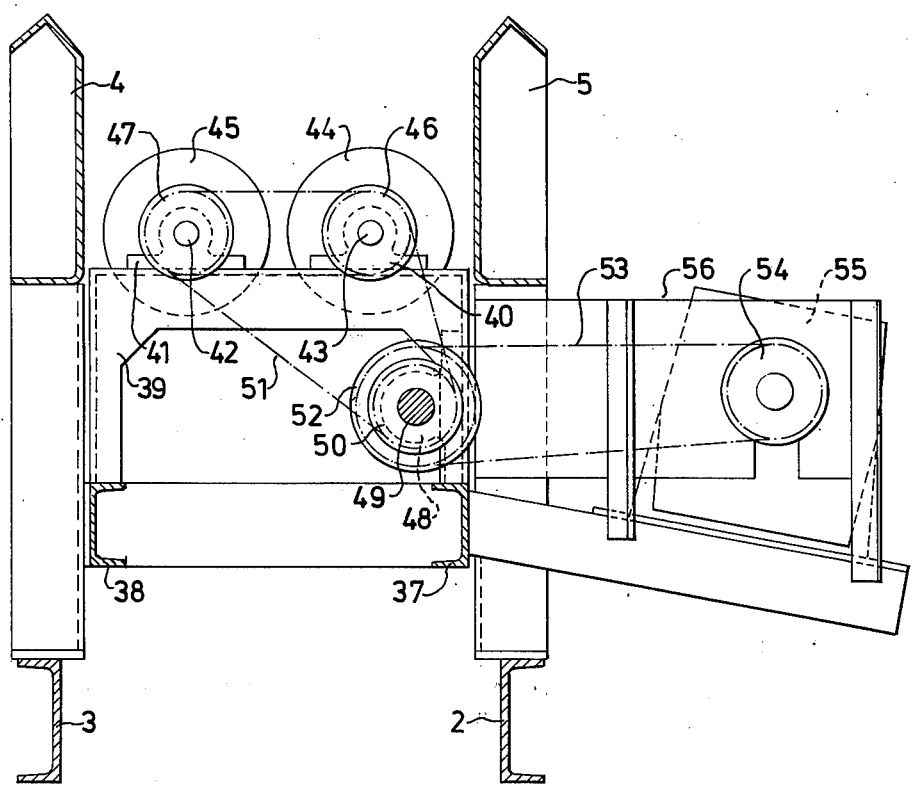

DEVICE FOR ROTATING PIECES OF LUMBER

The present invention relates to a device arranged in combination with a longitudinal conveyor for pieces of lumber, said device automatically starting to rotate a piece of lumber fed on the longitudinal conveyor around its own longitudinal axis, so that an operator can determine the quality of the piece of lumber.

The present invention relates to a device for rotating pieces of lumber around their own longitudinal axis, comprising a lifting frame located under a lumber conveyor and mechanically vertically movable, said lifting frame supporting a number of pairs of mechanically driven tooth wheels, the peripheries of which being near but free from each other and liftable over and lowerable under the supporting surface of the lumber conveyor by lifting and lowering respectively of said lifting frame. It is characterized by the fact, that, in combination with a known longitudinal conveyor having a number of diabolo shaped transport rollers spaced along the conveyor for longitudinal transport of the pieces of lumber, each of the pairs of tooth wheels are located in each of most of said spaces between said transport rollers, and that the shafts of each pair of tooth wheels are located at each side of a vertical, longitudinal, central plane of the longitudinal conveyor and are also parallel to said plane. Furthermore, said lifting frame is vertically movable preferably by a motor, such as for example a hydraulic motor, the operation of said motor for lifting of the lifting frame being mechanically controlled from a control desk having manually operable buttons, said operation depending on buttons that can be actuated in accordance with the dimensions of a piece of lumber.

The invention will be closer described below by way of an embodiment shown as an example in the attached drawings.

FIG. 5 shows on a greater scale a cross section at the line V—V in FIG. 2.

FIG. 6 shows on a greater scale a cross section at the line VI—VI in FIG. 1.

Figure 1:
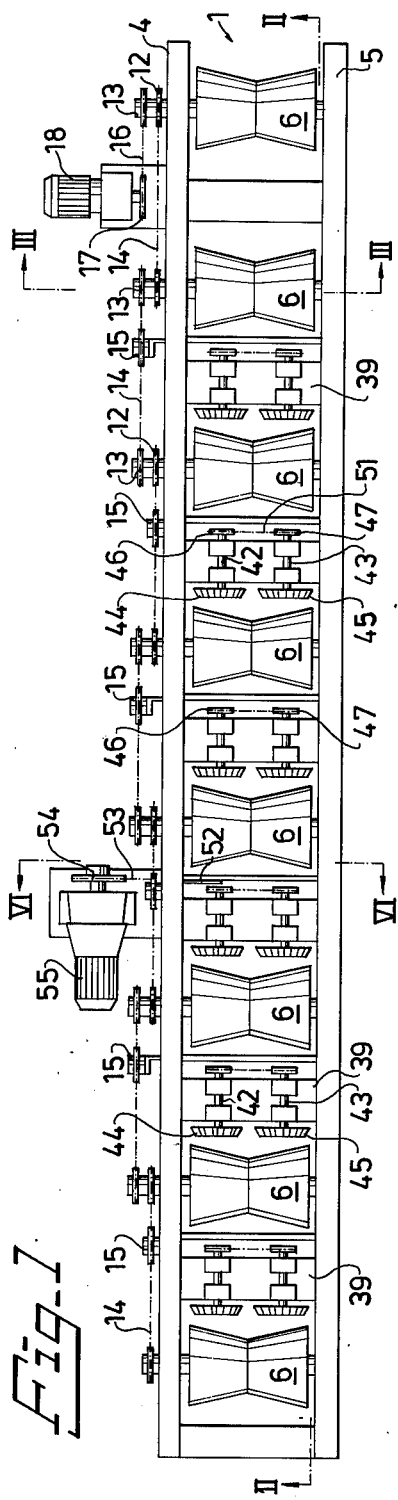
FIG. 1 is a horizontal view of a device according to the invention.
Figure 2:
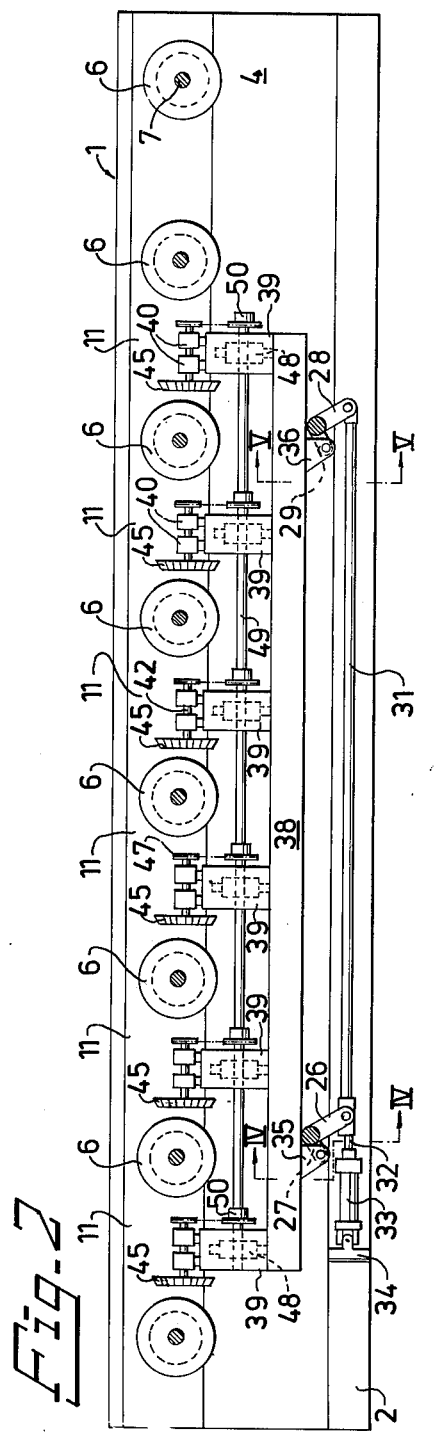
FIG. 2 shows a vertical longitudinal section at the line 11—11 in FIG. 1.
Figure 3:
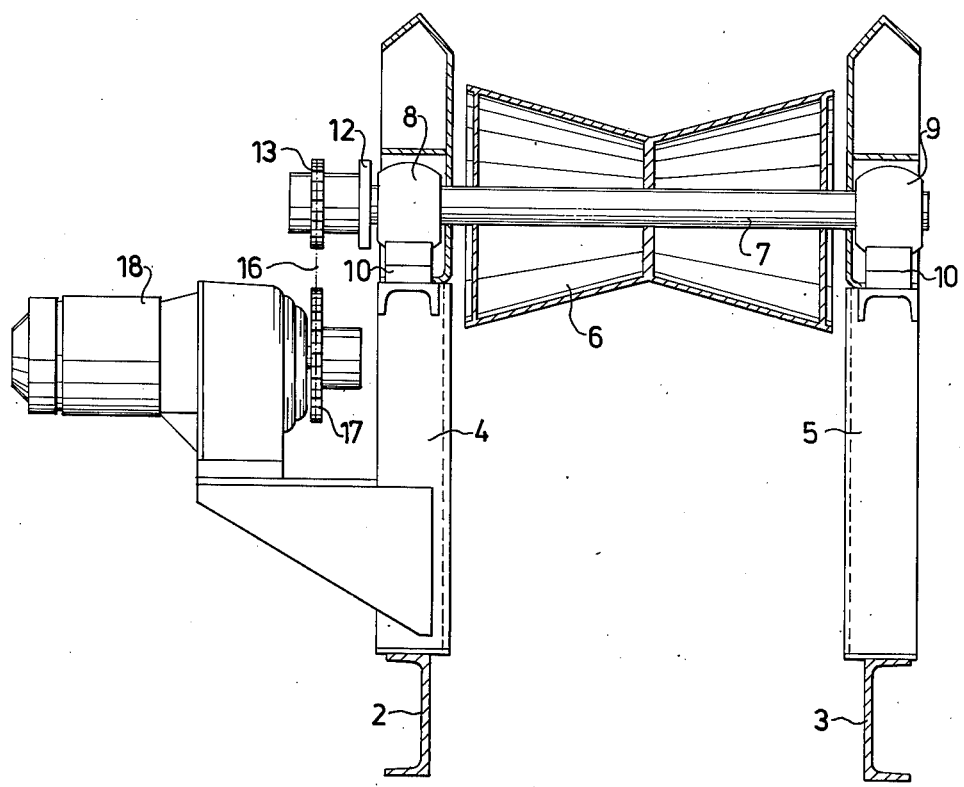
FIG. 3 shows on a greater scale a cross section at the line 111—111 in FIG. 1.

In the drawings, FIGS. 1 and 2, a longitudinal conveyor 1 for transporting pieces of lumber is shown, which pieces of lumber thereafter are to be processed in various respects by processing means, such as for example saw means and the like. The longitudinal conveyor has a substantial length, for example 7 m, that is at least as long as the pieces of lumber transported by it. Said conveyor comprises a pair of horizontal supporting beams 2, 3 and side plates 4, 5 arranged thereon, the shape of which being best illustrated in FIGS. 3 and 6. Transport rollers 6 of diabolo or hourglass shape and preferably having a rifled or in some other way friction increasing surface coating are each attached to a shaft 7. Each of said shafts 7 is journalled in bearings 8, 9 attached to and supported by said side plates 4, 5. Shock absorbing members 10 are suitably located under said bearings 8, 9. The transport rollers 6 are evenly spaced along the longitudinal conveyor 1, so that interspaces 11, see FIG. 2, are formed between said rollers.

At one end of the shafts 7 a pair of chain wheels 12, 13 are located, said chain wheels engaging in a number of endless chains 14 in the way shown in FIG. 1. A chain tightening wheel 15 cooperates with each endless chain 14. As can be seen in FIG. 1 to the right and in FIG. 3, one of the chain wheels 13 is connected by a chain 16 to a chain wheel 17 on the shaft of an electric geared motor 18, whereby said motor 18 can drive all the transport rollers 6. The motor 18 is supported by the side plate 4 and the supporting beam 2. The chain wheels and the chains are covered by protecting plates not shown.

Figure 4:
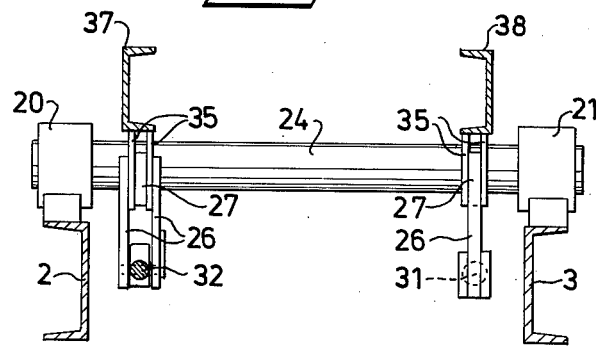
FIG. 4 shows on a greater scale a cross section at the line IV—IV in FIG. 2.

On the supporting beams 2, 3 see FIGS. 2, 4, 5, there are arranged bearing 20, 21 and 22, 23 respectively, each of which carrying a shaft 24, 25. Levers 26, 27 and 28, 29 respectively are arranged on each shaft 24, 25, said levers forming a right angle between each other and lying in the same plane. However, one lever 26, to the left in FIG. 4, is double and does not lie in said plane. The levers 26 and 28 are connected to each other by rod 30, 31. Furthermore, at least one lever 26 is connected to a piston rod 32 in a hydraulic cylinder 33, which is in turn connected to the supporting beam 2 by a universal joint 34. The levers 27 and 29 are articulated by short legs 35, 36, each of which consisting of triangular plates attached to lifting beams 37 and 38 extending along a substantial part of the longitudinal conveyor and shown in FIGS. 2, 4, 5, 6 but deleted from FIGS. 1 and 3 for the sake of clarity.

Said lifting beams 37, 38 support brackets 39 right in front of most of the interspaces 11 between the rollers 6, FIGS. 2 and 6, said brackets 39 being guided between the side plates 4, 5 and each of which carrying a shaft 42, 43 by two bearings 40 and 41 respectively. Each of said shafts 42, 43 has at one end a tooth wheel 44 and 45 respectively, and on the other end there is a chain wheel 46 and 47 respectively. Said tooth wheels 44, 45 lie in the same plane and are somewhat conical and have well rounded tooth tops or a soft periphery coating. Said brackets 39 also support a driving shaft 49 by bearings 48, said driving shaft extending through all the brackets 39, and at each of said brackets carrying a chain wheel 50 in the same plane as the chain wheels 46, 47. The chain wheel 50 and the chain wheels 46, 47 engage a chain 51, see FIG. 6, whereby the tooth wheels 44, 45 will have the same rotation direction. A chain wheel 52 is arranged on the driving shaft 49, said chain wheel 52 being in driving engagement by a chain 53 with a chain wheel 54 on the shaft of an electric geared motor 55. The motor 55 is supported by the lifting beam 38 and/or one of the brackets 39. In FIG. 6 the motor 55 is surrounded by a protecting cover 56. By the motor 55 all the tooth wheels 44, 45 can consequently by rotated simultaneously.

The lifting beams 37, 38 and the brackets 39 form a lifting frame, which can be lifted vertically to a somewhat higher position from the lower position shown in FIGS. 2, 4–6 by the rods 30, 31 and the piston rod 32 in the cylinder 33. When the lifting frame 37–39 is in its lower position, the peripheries of the tooth wheels 44, 45 are located somewhat under the lumber supporting upper peripherial surfaces of the transport rollers 6, and when the lifting frame 37–39 is in its upper position, the peripheries of the tooth wheels 44, 45 are located somewhat above said peripherial surfaces of the transport rollers 6 to hold a piece of lumber lifted up from the transport rollers.

In the device described both the transport rollers 6 and the tooth wheels 44, 45 can be in operation at the same time by the motors 18, 55, but alternatively of course only the driving means, such as the rolers 6 or the tooth wheels 44, 45 serving at the moment can be in operation.

The driving of the piston-cylinder-device 32, 33 is mechanically controlled in a way that will be closer explained below in connection with the description of the function of the device.

Pieces of lumber fed to the longitudinal conveyor 1 have been the subject of a procedure already before they reach the longitudinal conveyor, in which procedure certain information about the qualities of the piece of lumber, such as for example length, diameter and nail detection, are automatically registered. The values are displayed to an operator, who will judge the piece of lumber and register the quality values on a desk with buttons, and by registering (buttoning in) possibly correct already displayed values, for example for the diameter, if the piece of lumber is not straight. The buttons in the desk are connected to the operating members after the longitudinal conveyor for control thereof. If the buttons, that must be actuated, are actuated, the piece of lumber will be transported along the longitudinal conveyor without stopping. If, however, not all of the lastmentioned buttons have been actuated, this will be registered by a control device for the operation of the piston-cylinder-device 32, 33, whereby the piston rod 32 will be pulled inwards in the cylinder 33. The piston rod 32 and the rods 30, 31 will cause the levers 26, 27 and 28, 29 respectively attached to the shafts 24, 25 to swing, and the lifting frame 37–39 will be lifted upwards a distance long enough, that the tooth wheels 44, 45, which are rotating or which have just started to rotate, will come against and lift the piece of lumber from the transport rollers 6, and will make the piece of lumber slowly rotate. Hereunder the operator can examine the piece of lumber and actuate certain buttons, so that all the buttons, that must be actuated, will now be actuated. Thereafter the lifting frame 37–39 will be lowered and the piece of lumber will be fed ahead by the rollers 6 of the longitudinal conveyor.

By a construction according to the invention the following will thus be obtained. That information, which is determining for later processes of each piece of lumber is transmitted to each respective processing means, whereby each piece of lumber will get the treatment required in view of its qualities. Furthermore, the device operates fastly and efficiently, whereby the lumber transport capacity of the device will be high.

The invention is not restricted to only the embodiment described and illustrated in the drawings, as it can be varied within the scope of the invention. The hydraulic motor can for example be replaced by some other kind of motor, which can be connected to the lifting frame in various ways. Said motor can also be manually operable to lift the lifting frame.

What I claim is:

1. Lumber conveying and inspection apparatus comprising, in cooperative combination, an elongated conveyor for longitudinally receiving and longitudinally transporting pieces of lumber, and a lumber rotating device for selective rotation of the conveyor transported pieces of lumber about the longitudinal axes thereof; said elongated conveyor including a series of spaced transversely oriented transport rollers aligned therealong and defining a supporting plane for the pieces of lumber, and means continuously rotating said rollers in a common direction for the longitudinal transporting of the pieces of lumber; said rotating device comprising a lifting frame underlying and paralleling said conveyor, said frame supporting a plurality of pairs of spaced lumber turning wheels, one pair of wheels being located between each pair of adjacent conveyor rollers, the wheels of each pair being mounted on individual shafts for continuous rotation in a common direction about axes parallel to the length of the conveyor, and means for vertically moving said frame between a first position wherein the lumber rotating wheels are oriented below the roller defined supporting plane, and a second position wherein the wheels are oriented above the roller defined supporting plane for a raising of the lumber above the plane for directly supporting the lumber by the wheels for a rotation of the lumber about the longitudinal axis thereof, said lifting frame includes two horizontal lifting beams, each of said lifting beams including a short downwardly extending leg substantially at each end of said beams, each of said legs being connected to a first lever, said first levers being connected to transverse shafts connecting one of said legs on each of said beams, said conveyor including a pair of support beams and said shafts being supported by bearings mounted on said support beams, a free end of each of said levers being attached to a second lever, said second levers connected to one shaft being connected by a rod to said second levers of the other shaft, one of said second levers and rod being connected to a piston rod and hydraulic cylinder means for lifting said lifting beams and said frame, said hydraulic cylinder means being mounted to said supporting beams by a universal joint.

2. A device according to claim 1 wherein:
said means for vertically moving said frame including a hydraulic motor, said lifting frame arranged in the longitudinal direction of said conveyor, said beams including a plurality of brackets supported thereon between each pair of adjacent conveyor rollers, each of said brackets carrying bearings for the shafts of said wheels, and a drive shaft, disposed in the longitudinal direction of said frame, mounted in bearings in said brackets, said drive shaft being drivingly connected by chain driving means to all of the wheel shafts and being driven by an electric geared motor.

3. A device according to claim 1 wherein:
said lifting frame is guided in the transverse direction by side plates supported upon said supporting beams.

* * * * *